United States Patent [19]

Schnur

[11] Patent Number: 5,651,809

[45] Date of Patent: Jul. 29, 1997

[54] PROCESS AND DEVICE FOR SEPARATING GASEOUS COMPONENTS

[75] Inventor: Gerald Schnur, Graz, Austria

[73] Assignee: Andritz-Patentverwaltungs-Gesellschaft m.b.H., Graz, Austria

[21] Appl. No.: 576,396

[22] Filed: Dec. 21, 1995

Related U.S. Application Data

[63] Continuation of Ser. No. 204,189, Mar. 4, 1994, abandoned.

[30] Foreign Application Priority Data

Sep. 6, 1991 [AT] Austria .................................. 1772/91

[51] Int. Cl.[6] ............................................ B01D 19/00
[52] U.S. Cl. ............................ 95/261; 96/214; 96/216
[58] Field of Search ............................. 95/261; 96/196, 96/182, 216, 217, 208, 214; 261/86, 87

[56] References Cited

U.S. PATENT DOCUMENTS

| | | | |
|---|---|---|---|
| 1,829,674 | 10/1931 | Rosenlocher | 96/217 X |
| 2,416,193 | 2/1947 | Meyers | 96/217 X |
| 2,575,568 | 11/1951 | Topanelian, Jr. | 96/217 |
| 2,928,661 | 3/1960 | MacLaren | 261/87 X |
| 3,092,678 | 6/1963 | Braun | 261/86 X |
| 4,326,863 | 4/1982 | Day et al. | 96/182 |
| 4,410,337 | 10/1983 | Gullichsen et al. | 95/261 X |
| 4,414,006 | 11/1983 | Armstrong | 96/217 X |
| 4,600,413 | 7/1986 | Sugden | 95/261 X |
| 5,141,535 | 8/1992 | Elonen et al. | 96/217 |

FOREIGN PATENT DOCUMENTS 392216  2/1991  Austria .

*Primary Examiner*—Richard L. Chiesa
*Attorney, Agent, or Firm*—Chilton, Alix & Van Kirk

[57] ABSTRACT

The invention relates to a process and apparatus for separating gaseous components from pourable media. The main feature of the invention is that regions of under pressure are formed by relative movement between the media and a substantially vane-shaped external surface on a body arranged therein. The gas collecting in the under pressure regions is evacuated through the interior of the body. The body is preferably arranged to rotate, such that at least one inlet on the body at the under pressure region communicates with a gas outlet inside the body to remove the separated gas.

52 Claims, 9 Drawing Sheets

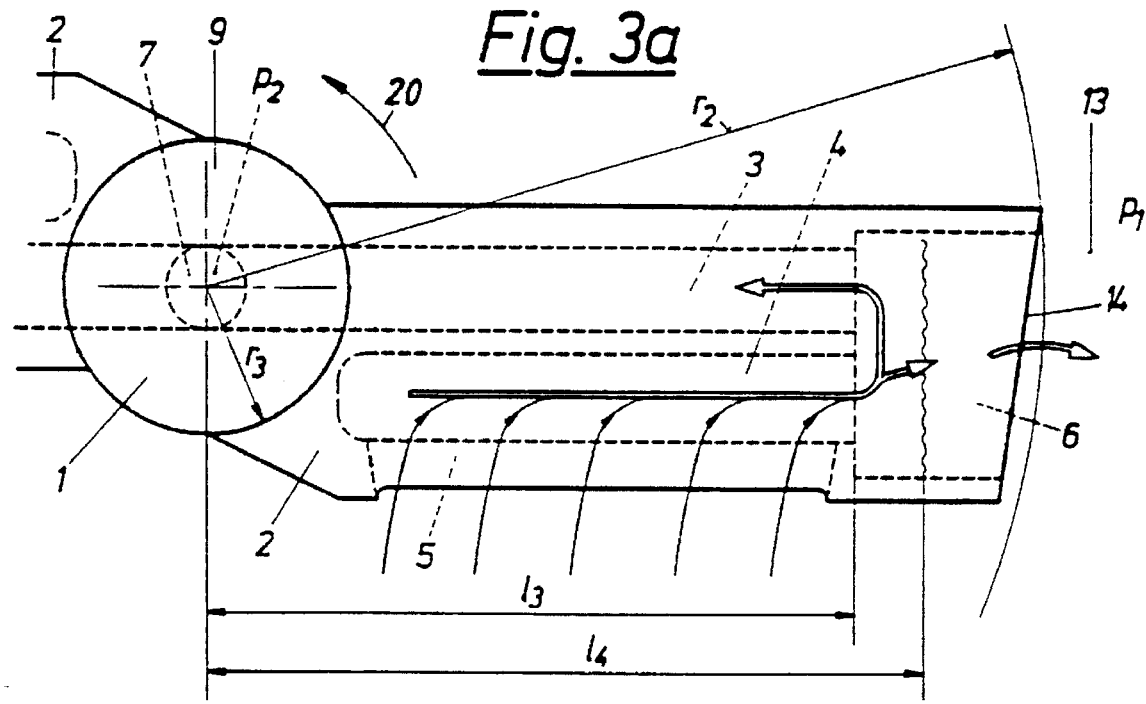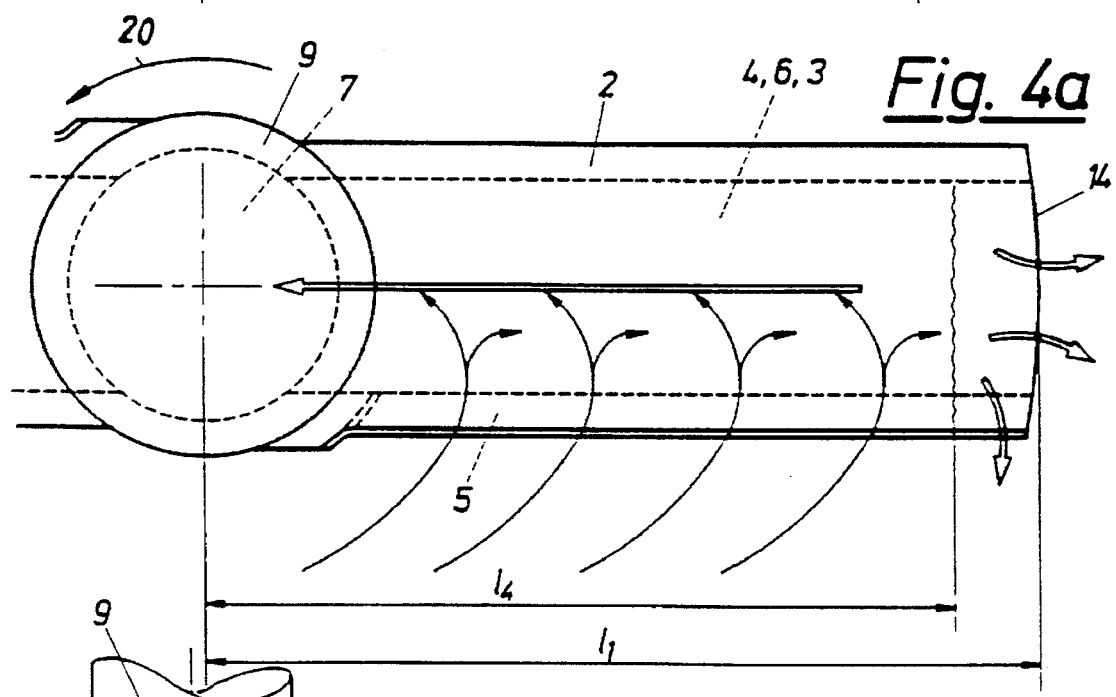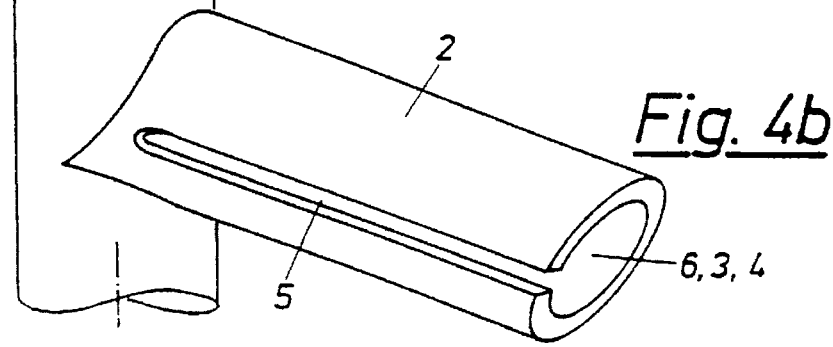

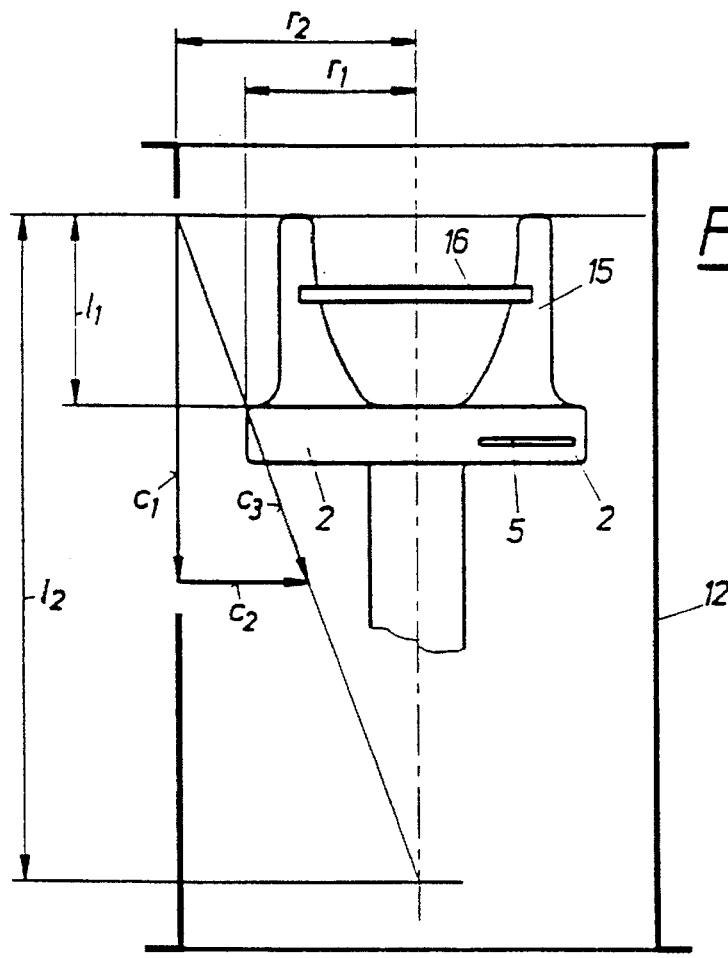
*Fig. 12*
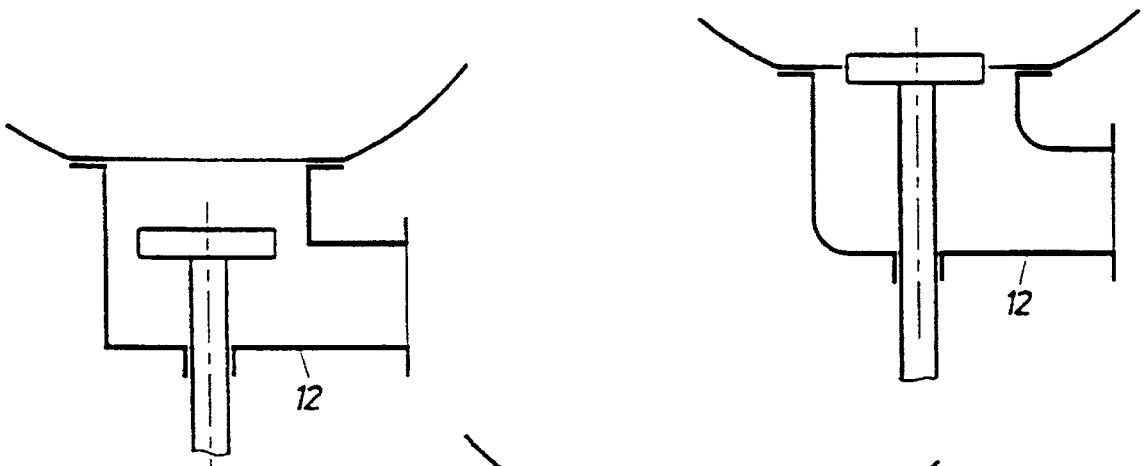
*Fig. 13*   *Fig. 14*
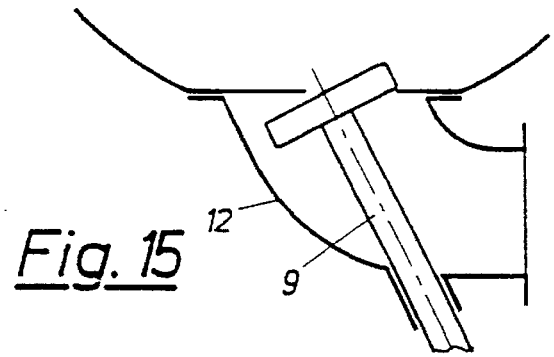
*Fig. 15*

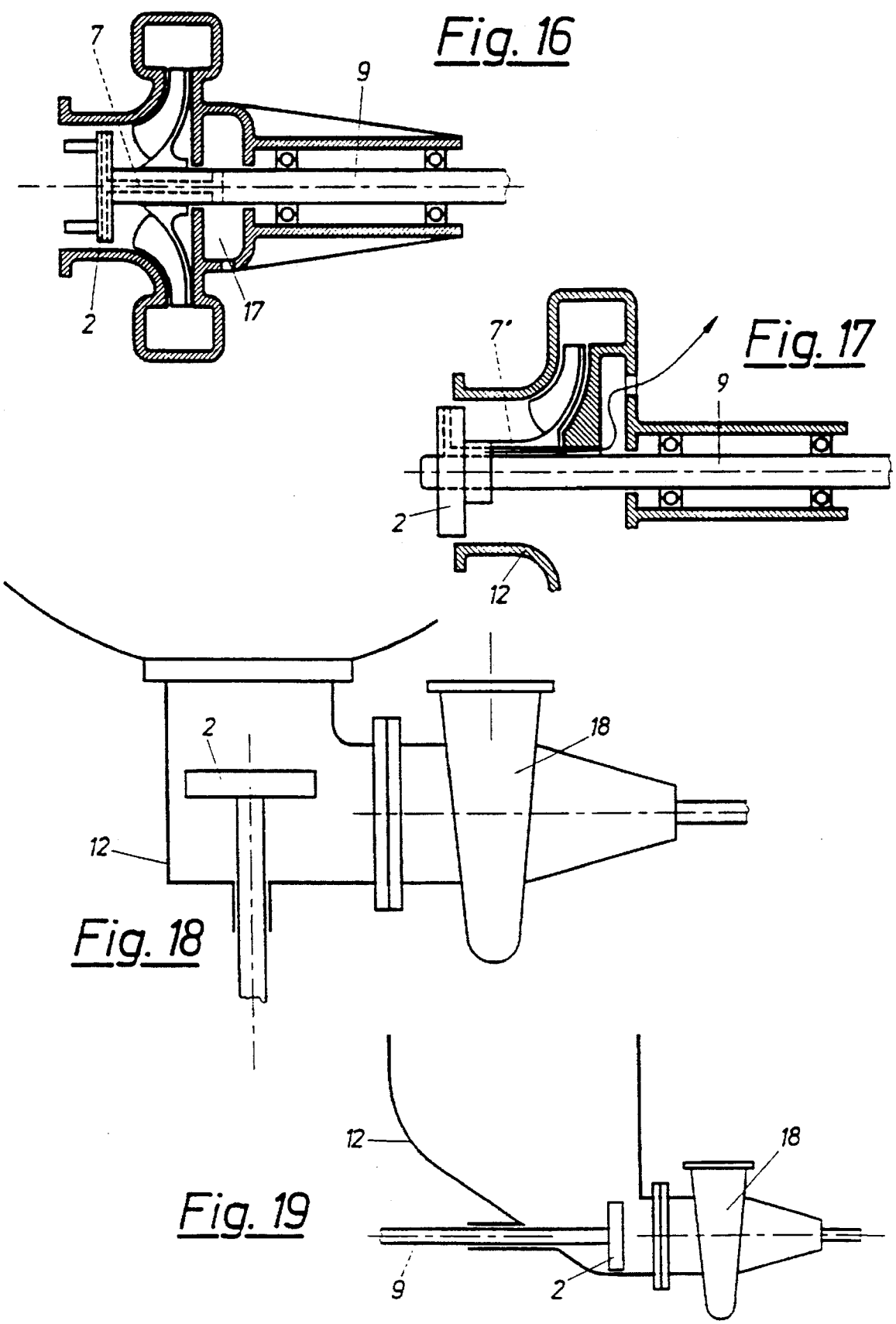

5,651,809

PROCESS AND DEVICE FOR SEPARATING GASEOUS COMPONENTS

This application is a continuation of application Ser. No. 08/204,189 filed on Mar. 4, 1994, now abandoned, which is a 371 PCT/AT92/00113 filed Aug. 17, 1992.

BACKGROUND OF THE INVENTION

The invention relates to a process, a device, and an installation using this device for the separation of gaseous components from pourable media, in particular suspensions of solids.

Processes and devices for the separation of gases from liquids, suspensions and solids-gas-mixtures known so far operate on the principle of a centrifuge. Here the medium to be separated from the gas must be set in rotation, the heavier components being enriched at longer radii because of stronger centrifugal forces and the gases and more volatile components mainly at shorter radii and at the center of rotation, respectively. The gas accumulated at shorter radii is then evacuated from the system via an appropriate conduit. In most cases underpressure is applied to the evacuating system for the removal of gas.

A disadvantage of such processes is that energy has to be introduced into the medium for generating swirl, which energy is completely or partly lost in the further course of the process.

A further disadvantage resides in the fact that complicated control is often necessary in order to avoid that a large amount of gas, in particular air, but no other components are separated. This applies in particular when varying amounts of gas occur in the medium to be degassed during operation.

Conventional processes are furthermore disadvantageous in that additional devices aiming at a stabilization of the spout-like gas separation are necessary for efficient operation.

With media and liquid-solids-gas-mixtures, respectively, as for instance the suspensions of fibrous material occurring in paper and pulp industry, the gaseous components (mostly air) adhere well to the fiber network, thus making the segregation of gaseous and non-gaseous components (water, fibers, etc.) more difficult. In these cases it is of major importance to keep the distance the gas has to travel inside the medium in order to reach the zone from where it may be evacuated as short as possible. The result thereof is that with known processes long dwelling times of the medium in the region of the centrifuge are necessary because of the long travel distances, and thus the throughput of the medium is strongly limited or the centrifuge becomes very long.

A further disadvantage of known processes and devices resides in the fact that, in order to prevent the concomitant separation of non-gaseous components, provision has to be made for devices functioning as a sieve. Especially with media likely to form clots, as for instance the fiber suspensions dominating the paper and pulp industry, the components carried along with the evacuated gas may result in clogging. Rinsing means are necessary in order to prevent this.

SUMMARY OF THE INVENTION

The present invention avoids the above disadvantages. For this purpose it proposes a process which is characterised in that underpressure zones are formed by relative movement between the media and a body, in particular a rotary body, arranged within these media, as a result of the shape thereof and in that the gas accumulating in the underpressure zones is evacuated via the interior of the body.

The effect of centrifugal force is employed for separating gaseous components from the medium. Advantageously according to the invention the medium enriched with gas, entering the interior of the body together with accumulated gas, is subject to further degassing by centrifugal force inside the body.

Conveniently the medium degassed inside the body is recycled to the medium surrounding the body.

The relative movement between the body and the medium may be achieved by moving the body or the medium, but also by simultaneously moving the body and the medium.

Advantageously according to the invention the relative movement is achieved by preferably continuous rotation of the body.

Conveniently according to the invention the relative movement is achieved by preferably continuous rotation of the body and movement, preferably for conveyance of the medium.

In industrial processes quite frequently media of varying composition, for instance due to changing pressure and temperature conditions, are to be subjected to a treatment. In order to optimize the separation of gas from medium of varying composition, according to the invention the relative speed is adjusted by changing the speed of movement of the body and/or the medium, in particular in dependance on the state parameters of the medium to be degassed.

Conveniently according to the invention the direction of flow of gas inside the body is changed by deviating it.

Underpressure is applied in order to promote the separation of gas from the medium. Advantageously according to the invention the gas separated from the medium is removed from the interior of the body under application of underpressure.

Conveniently according to the invention the underpressure applied is adjusted in dependance on the state parameters of the medium to be degassed.

The invention also relates to a device for separating gaseous components from pourable media, in particular for carrying out the process according to the present application.

The invention is characterised primarily in that the device for generating relative movement is disposed between the media and a body arranged within these media, which body is in particular provided rotatably and has a shape generating underpressure on the surface of the body in the course of this relative movement, and in that the body has at least one inlet in the region of the underpressure zones, which inlet communicates with a gas discharge for transporting off separated gas.

According to an advantageous embodiment of the invention the body takes the form of a rotary body and the gas discharge has at least one through-channel in the body and opening in the region of the radially outer circumference.

Conveniently according to the invention the channel opening in the region of the radially outer circumference discharges into an enlarged cavity, preferably in the region of the radially outer circumference.

Advantageously according to the invention the channel open in the region of the radially outer circumference communicates with a further channel, optionally via an enlarged cavity.

Conveniently according to the invention the body has several arms. Advantageously according to the invention several arms are arranged in one plane.

According to the present invention it may also be convenient for the arms to be arranged in at least two planes with respect to the rotational axis, preferably above each other.

Conveniently according to the invention the gas discharge opens into a collecting channel.

According to an advantageous embodiment of the invention the gas discharge communicates with a gas evacuation device, in particular a suction device, preferably via the collecting channel.

In order to promote the evacuation of gas from the medium the body of appropriate shape is moved. According to an advantageous embodiment of the invention the body and the arms, respectively, is/are connected to a drive device, in particular to a drive shaft.

Conveniently according to the invention the collecting channel is arranged in the drive shaft. Preferably according to the invention the collecting channel is arranged between hub and shaft.

The configuration of the entrance opening on the body exerts a major influence on the efficiency of the separation of gas from the medium. Conveniently according to the invention at least one inlet is of circular cross section. Preferably at least one such inlet is formed as a bore.

Conveniently according to the present invention several such bores are, at least substantially in a radial direction, arranged adjacent to each other on the body.

According to the present invention it is also advantageous for several such bores to be arranged adjacent to each other on the body, at least substantially in parallel to the rotational axis.

According to a preferable embodiment of the invention at least one inlet takes the form of a slot. Conveniently at least one slot-like inlet is oriented in the radial direction.

Preferably according to the invention at least one inlet has a cross section widening in the direction towards the interior of the body, preferably in a continuous fashion.

According to an advantageous embodiment of the invention at least one additional profile being oriented at least substantially in parallel to the rotational axis is provided in the region of the radially outer circumference.

The invention also relates to an installation using the device for separating gaseous components from pourable media, in particular solid suspensions, described above. Conveniently according to the invention the device is arranged within a housing. According to another advantageous embodiment of the invention the device is arranged in a channel, in particular a pipe, a bent and a curved pipe, respectively.

Conveniently according to the invention the device is arranged in an oblique position in the housing and channel, respectively.

Advantageously according to the invention the device is arranged in an eccentric position in the housing and channel, respectively.

According to an advantageous embodiment of the invention the device is arranged downstream of a container and protrudes at least partly from the housing and channel, respectively, into the container.

Conveniently according to the invention the device is arranged upstream of a pump.

Advantageously according to the present invention the device is directly connected to the shaft of the pump. According to a preferred embodiment of the invention the device takes the form of a pump rotor vane.

BRIEF DESCRIPTION OF THE DRAWINGS

The invention will be described by way of the exemplary embodiments in the drawings, wherein FIGS. 3a and 4a show a plan view of a device according to the invention with flow lines shown, FIGS. 4b to 11 show side views of diverse variants of the type and place of positioning of suction openings, FIG. 12 shows a side view of a variant of the invention having additional elements for generating a centrifugal effect, FIGS. 13 to 15 show side views of variants of the assemblage of the device in an installation, FIGS. 16 and 17 show vertical sections of variants of the device directly connected to a pump shaft, FIGS. 18 and 19 show side views of variants for arranging the device upstream of a pump.

DESCRIPTION OF THE PREFERRED EMBODIMENTS

Figure 1:
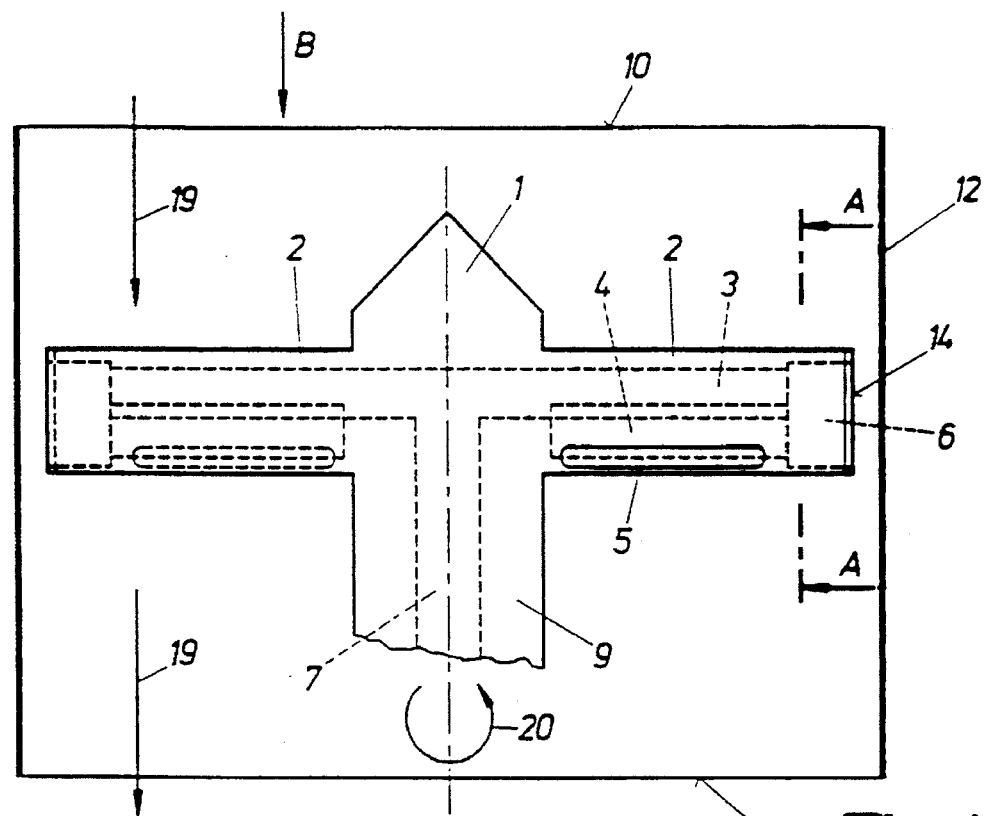
FIG. 1 shows a side view of a device according to the invention.

FIG. 1 shows a side view of a device according to the invention which essentially consists of a body 1 having arms 2 extending radially outwards, each of which is provided with channels 3 and 4, an inlet 5 and a cavity 6 opening outwardly, so that there is a connection to space 13 where the medium to be degassed is located. The suction opening or inlet 5 connects space 13 to channel 4, which is in turn connected to cavity 6. Channel 3 connects cavity 6 to the suction conduit or collecting channel 7. Body 1 is connected to a drive shaft 9, so that the whole device rotates in direction 20 in a housing 12 into which feed medium may enter through an opening 10 and from which the medium processed according to the invention may exit through an opening 11.

Figure 2:
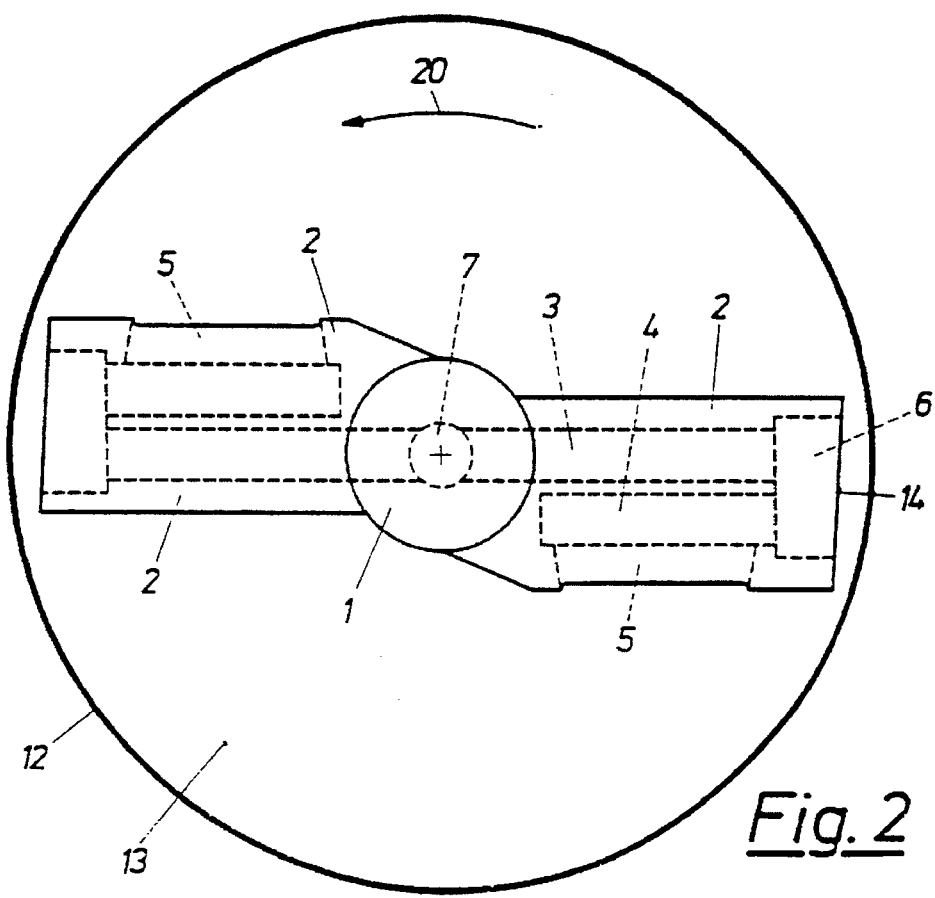
FIG. 2 shows a plan view in direction B according to FIG. 1.
Figure 2A:
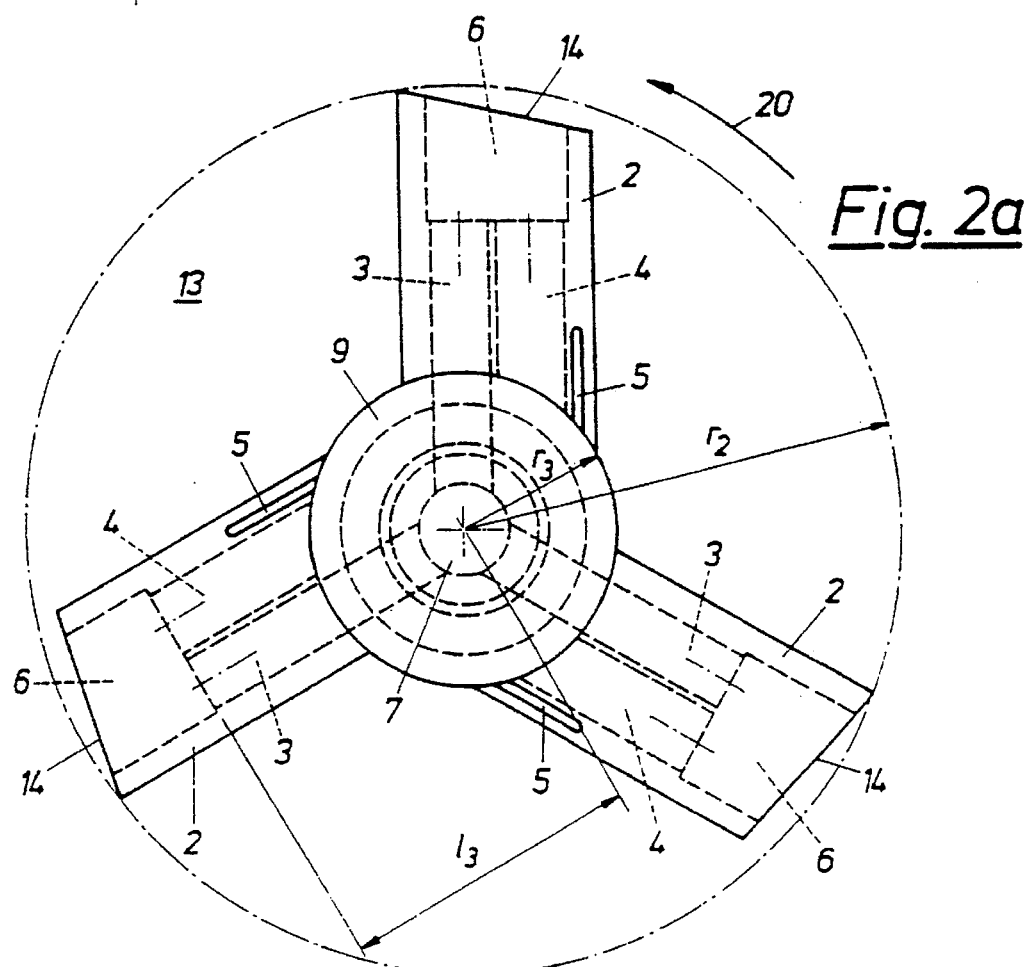
FIG. 2a shows a plan view of a further device according to the invention.

FIG. 2 shows a plan view of the device, similar parts being indicated with the corresponding reference numerals according to FIG. 1. An embodiment having three arms 2 is shown in plan view in FIG. 2a.

Figure 3:
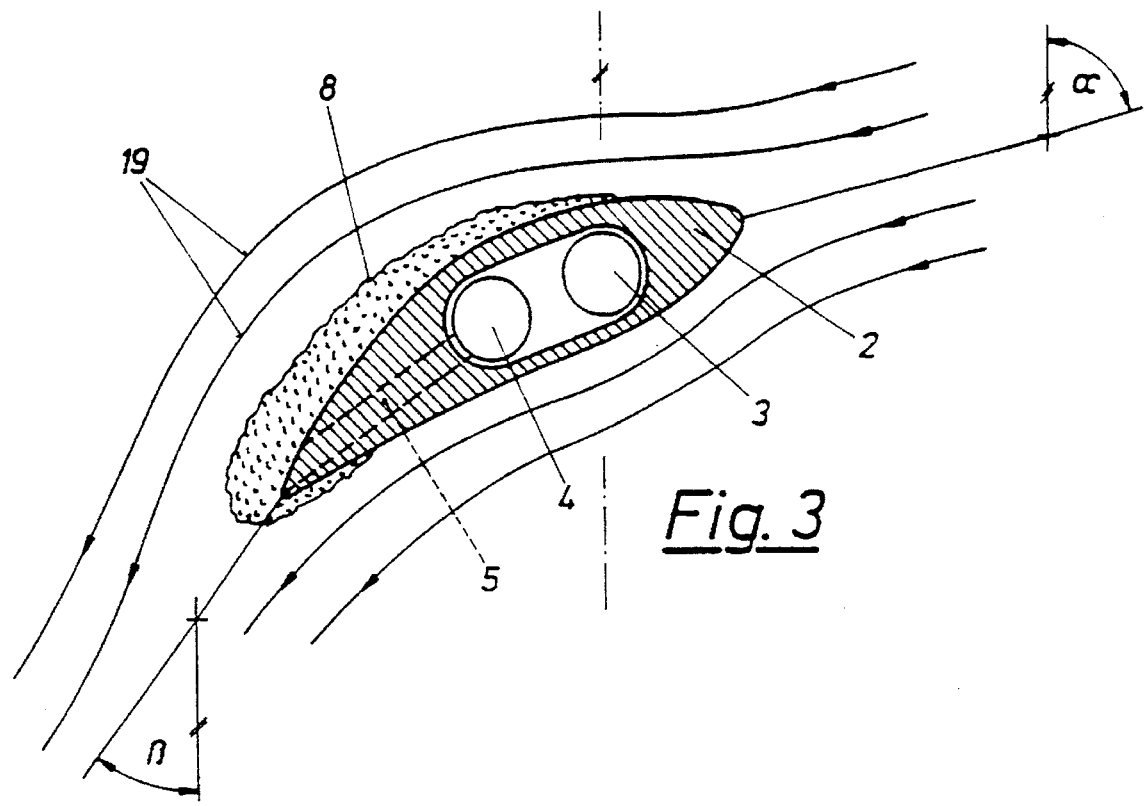
FIG. 3 shows section A—A according to FIG. 1 as well as flow lines of the medium.

Section A—A according to FIG. 1 is shown in FIG. 3. FIG. 3a shows a plan view of a device according to the invention, this figure giving, on the one hand, media flows and, on the other hand, important operation and device parameters. With reference to these figures the process is to be explained in more detail now. Rotation of the device generates a relative speed R between the medium to be degassed and the arms 2. The medium now flows around the upper and lower external surfaces of arms 2 in direction 19, generating underpressure zones 8 having a pressure $p_3$ in certain locations of the arms 2 and in its surroundings, where the gas or gas-enriched medium accumulates because of its low specific density. The relative speed R is chosen so that it results in a sufficient pressure difference ($p_1$–$p_3$) to cause the separation of gas. Here the relative speed R is determined by the number of revolutions n as well as the radial dimensions ($r_1, r_2, r_3, l_3, l_4$), the number of revolutions being higher than a minimum value of about 200–300 rpm. The gas or gas mixture accumulated in the underpressure zones 8 subsequently, via suction inlet 5, enters channel 4 and furthermore cavity 6. Pressure $p_2$ prevailing in collecting channel 7 is set so that it is lower than pressure $p_3$ of underpressure zones 8. In this cavity 6, due to the higher centrifugal force prevailing there, the gas in the gas-enriched medium is effectively completely separated from non-gaseous components possibly present. The separated components are again recycled to the medium flow through the outer open end of cavity 6 remote from the zone 8. The purified gas enters the collecting channel 7 via channel 3. With appropriate design of the device and choice of operation parameters (e.g. number of revolutions, underpressure) no control is necessary during operation. This results in high safety of operation even with highly varying operating conditions and markedly different compositions of the liquid-solids-gas-mixture.

Advantageously inlet 5 is formed so that it results in the evacuation of gas over a certain area by a large radial extension and thus keeps the distance the gas has to cover in the medium in order to reach the zone of suction short. With media which are difficult to degas the distance may be kept correspondingly short by increasing the number of revolutions n in order to achieve effective degassing anyhow.

The separation of non-gaseous components from the gas by differing centrifugal forces of the components caused by the differences in density takes place in cavity 6. Separation is effected at a distance $l_4$ from the center of rotation. The forced dislocation of the process of separation to a relatively large distance $l_4$ from the center of rotation as compared to known processes with the formation of spouts near the center of rotation results in extremely good separation of the components. The (solid and liquid) components separated from the gas are recycled to the medium via the cavity 6 open towards the radially outer periphery of the rotary body. The gas is redirected at least 90° relative to the direction of entry of the medium into cavity 6 and evacuated from the device via channel 3 and collecting channel 7. For the functioning of the device wherein the gas is redirected there is a lower limit of dimension $r_2$–$l_3$ of cavity 6. This is, on the one hand, determined by the fact that the medium enters the cavity 6 because of the pressure difference $p_1$–$p_2$ (external pressure of the medium minus pressure in collecting channel 7). Due to the rotation a counterpressure is generated by the centrifugal forces until a penetration depth of the medium of $r_1$–$l_4$ has been reached, where a pressure equilibrium comes about. On the other hand, the cross sectional area of the cavity 6 between $l_4$ and $l_3$ is to be kept so large that the gas may unrestrictedly pass from channel 4 to channel 3.

The pressure drop from outer space 13 via cavity 6 into channel 3 or 7 may be promoted by appropriately forming the outer contour 14 of body 1 and arms 2, respectively, if, for instance, the outer contour 14 takes such a form that the radial extension of arms 2 decreases in the direction opposite the direction of rotation, thus creating an underpressure zone 8 in this region. Because of the underpressure zone 8 the medium cannot penetrate into the cavity 6 as deeply as would be the case with a cylindrical outer contour 14.

Thus with this process, even in cases of varying operating conditions, no control activities are necessary; instead, effective degassing of the medium at high operating reliability takes place because of the practically delay-free procedure even in cases of highly unsteady operating conditions. Even in the extreme case of the medium being completely free of gas no non-gaseous components may get out of the system if the dimensions and operative parameters are chosen appropriately. In this case the medium flows into channel 4 via inlet 5 and returns to the outer space 13 via cavity 6.

The medium is conveyed by appropriately shaping the arms 2 and angles α and β, respectively, with respect to the rotational axis. The angles α and β, respectively, are chosen in dependance on the amount of throughput of medium to be degassed, the number of revolutions, and the desired conveyance behaviour, and with one embodiment of the rotor vane type may differ as to the radius. Ordinarily angle $\alpha \geq \beta$.

Thus, it may be seen by inspection of FIGS. 1–3, that the body has a radially inner portion mounted for rotation about a central axis, a radially outer portion defining a radial periphery, and a continuous internal space extending from the inner portion to the outer portion of the body. In the illustrated embodiment, the inner space includes a cavity 6 at the outer portion of the body, defining a media discharge opening at the radial periphery 14. Discharge channel 3 extends in fluid communication between the cavity 6 and a gas discharge opening at the radially inner portion of the body, in fluid communication at the discharge opening with the collecting channel 7. The inlet opening 5 is in fluid communication with the internal space, which may include an inlet channel 4 extending in fluid communication between the inlet 5 and the cavity 6. The discharge channel 3 extends radially and the inlet channel 4 extends in parallel to the discharge channel. As shown in FIG. 1, the inlet channel 4 can be situated at a different elevation from the discharge channel 3, when the body is viewed in cross section.

Figure 5:
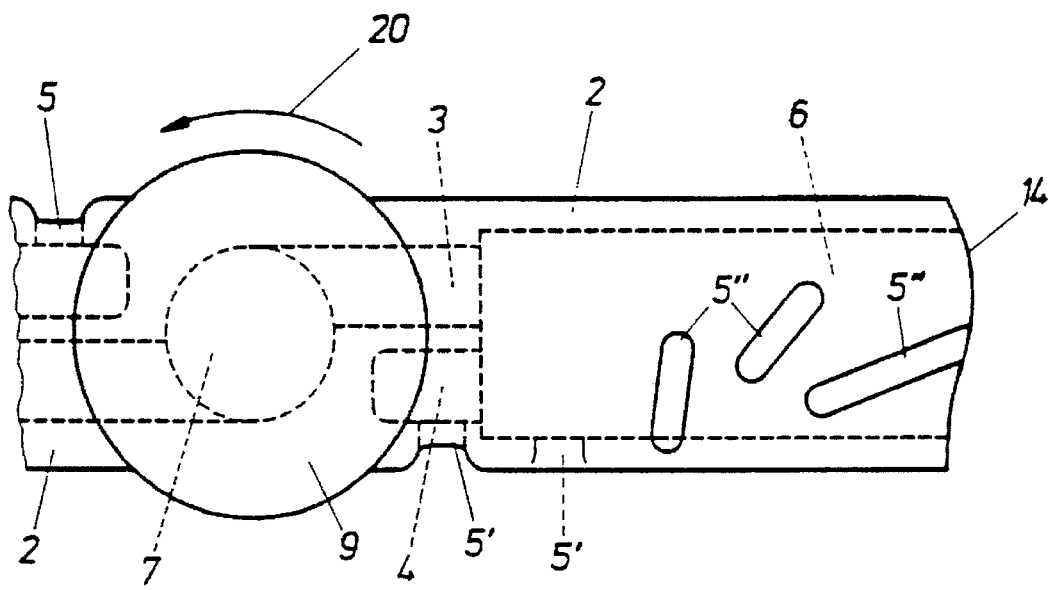
Figure 6:
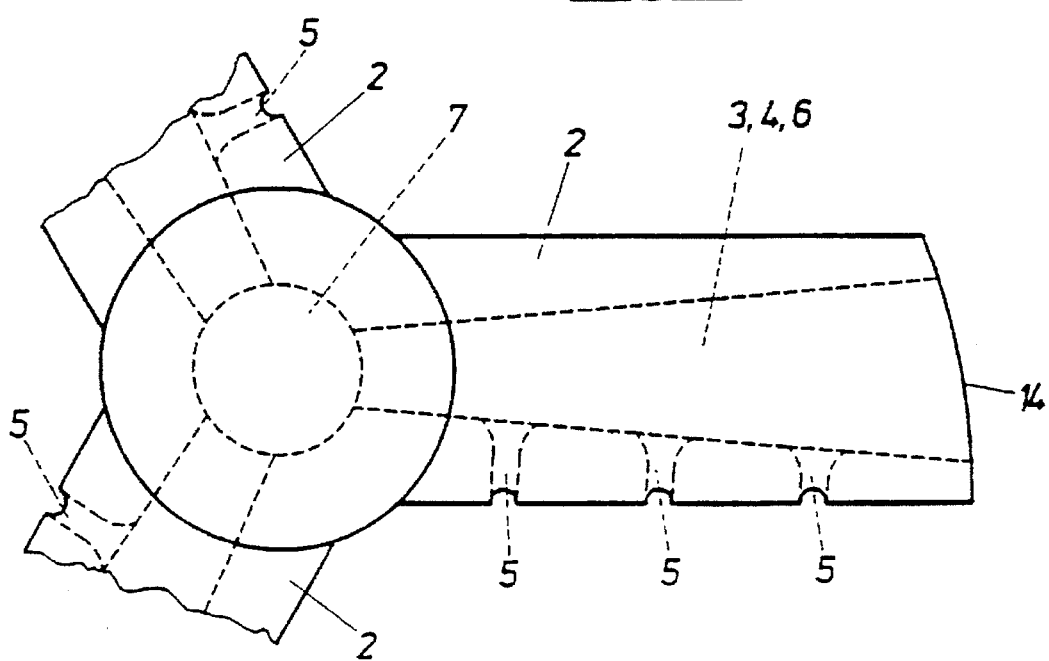

The cross section of inlet 5 and its course, respectively, may be different. Thus FIG. 4a in plan view and FIG. 4b in side view, respectively, show a slot-like inlet 5, extending over the total length of arm 2. FIG. 4a again shows the individual media flows (liquid-solids-gas-mixture, gas, non-gaseous components). In this embodiment, the interior space consists of a cavity 6, 3, 4 extending radially along a straight path between the gas discharge opening and the media discharge opening. By way of example FIG. 5 shows diverse configurations of inlet 5, these being employable alone as well as in combination. It illustrates bores 5' arranged near shaft 9 and ending, on the one hand, in a channel 4 and, on the other hand, in a cavity 6. Furthermore slot-like openings 5" are shown, the direction of which is tangential to the direction of movement and in any oblique arrangement thereto, respectively, this choice depending on the material parameters of the medium and the other operating conditions. If the non-gaseous components may be separated easily, channels 3 and 4 may be short as shown in FIG. 5 or a single cavity may perform the function of channels 3,4 and of cavity 6 (FIG. 6). The cross section of inlets 5, having the form of bores in FIG. 6, increases in the direction of cavity 3,4,6, and this is how clogging by non-gaseous components carried along is prevented.

Figure 7:
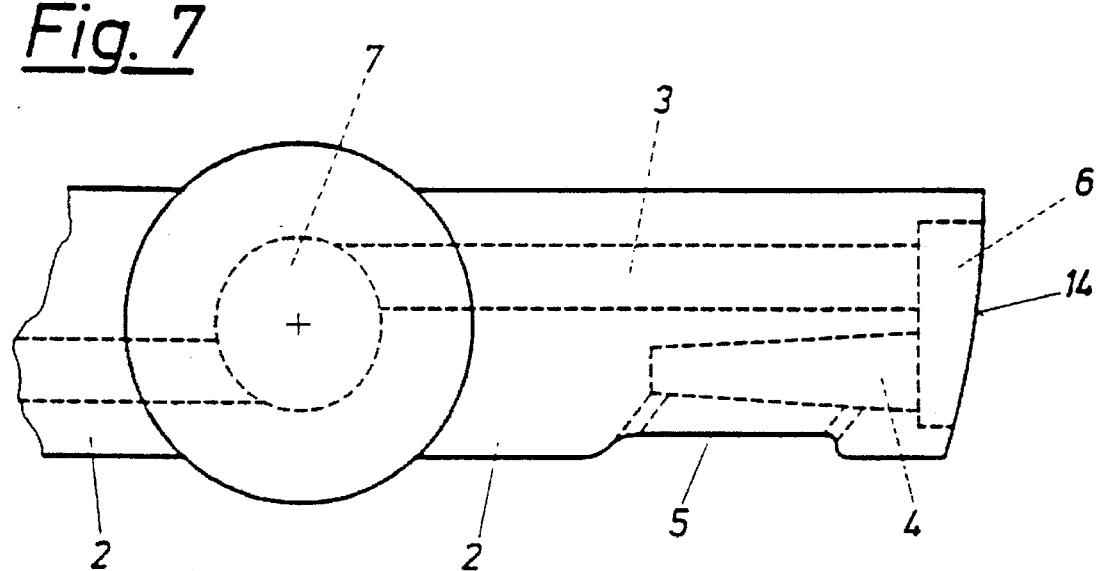
Figure 8:
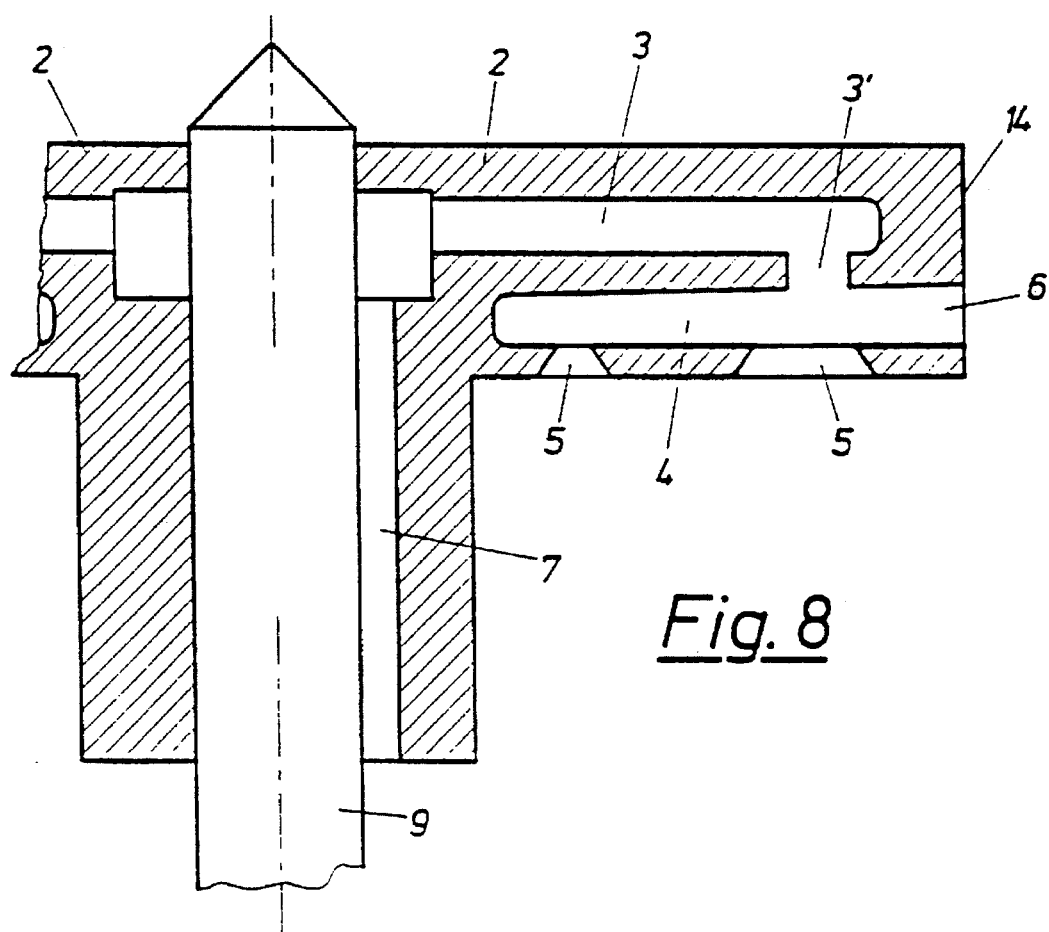

In the case of minor amounts of gas to be separated the cavity 6 may also be very small (FIG. 7). Also, as shown in FIG. 8, channels 3 and 4 may be directly connected via opening 3'. FIG. 8 furthermore shows a variant of how to form the collecting channel 7, which in this case surrounds shaft 9 as an annular gap.

Figure 9:
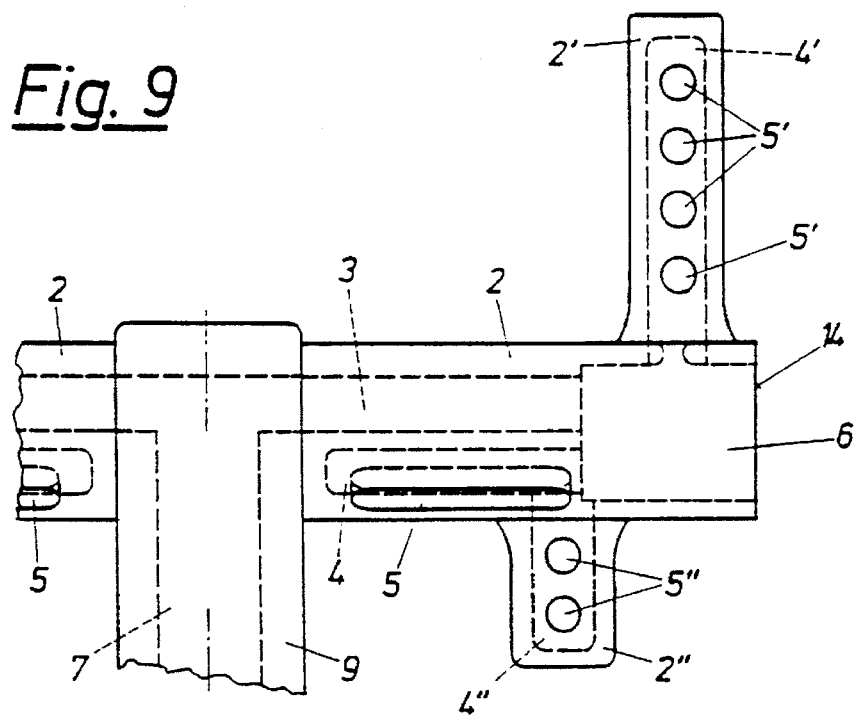
Figure 10:
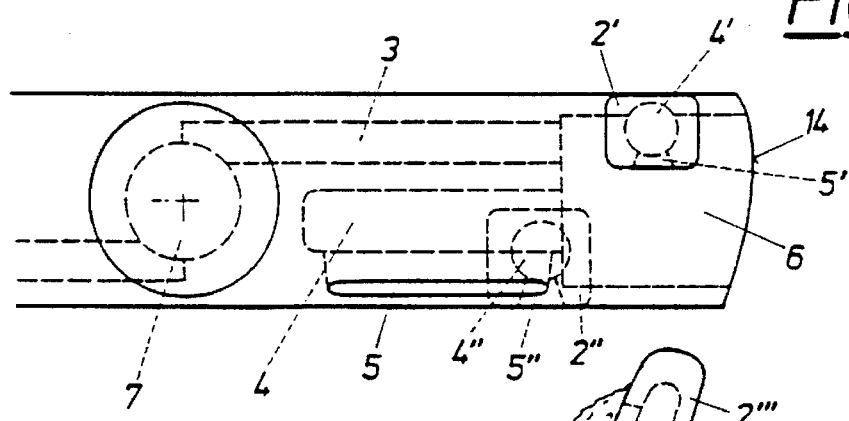

FIG. 9 and the plan view thereof in FIG. 10 show an embodiment with media that are difficult to degas or large amounts of gas to be evacuated. Here body 1 is provided with additional wing portions 2' or 2" which extend from the arm portion 2 in a direction substantially parallel to the central axis, and define the external surfaces which generate the under pressure zones. The wing portions have openings 5' and 5", respectively, (shown as bores here, but also possible in slot-like configuration), which communicate with cavity 6 via channels 4' and 4", respectively, or optionally via a channel 4. These inlet openings 5', 5" are oriented to draw gaseous components with media, in a direction which is substantially mutually perpendicular to the central axis and a radius passing from the axis through the arm. In this embodiment, the discharge channel 3 extends radially, and the inlet channels 4', 4", enter the cavity 6 (either directly or indirectly via channel 4), along a path which is substantially parallel to the central axis.

Figure 11:
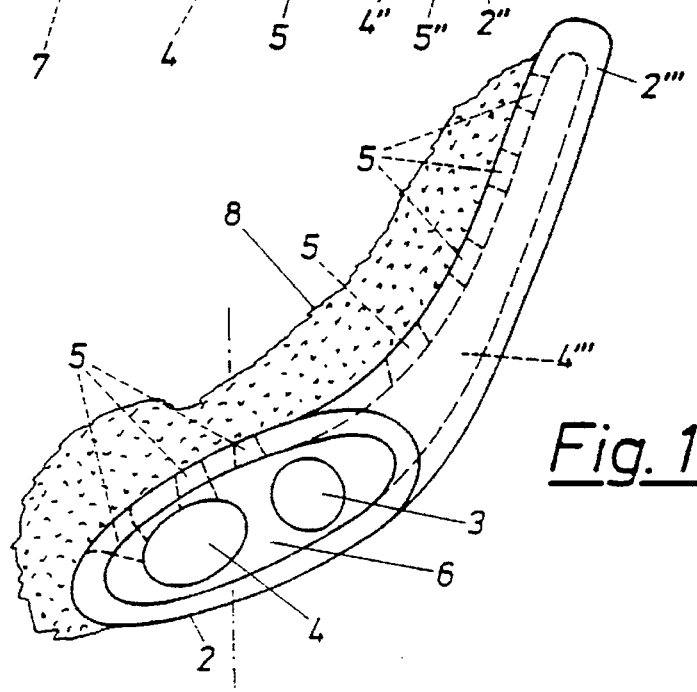

FIG. 11 shows a further embodiment of the device having an additional portion 2''' and a channel 4''', suction from the underpressure zone 8 taking place via inlets 5.

FIG. 12 illustrates a variant of the device according to the invention, combining the process according to the invention with the known processes employing centrifugal effect. Elements 15 are provided here, which are able to degas the medium in the outer peripheral region up to about $r_1$ according to the principle of a centrifuge. Appropriate portions 16 may be provided for stiffening purposes. The advantage of this embodiment resides in the fact that the length of the construction is considerably shortened as compared to known devices and that no gas separation has to take place within the area of $r_1$. Thus the distance to be covered by the gas to be separated is considerably reduced. The elements for stabilizing the spout as well as the necessity for elaborate control may be dispensed with as well. The individual gas velocity components are illustrated here as well, namely in axial direction the same speed as medium $c_1$, in radial direction component $c_2$ depending on the medium to be degassed and the operative parameters, and the velocity component $c_3$ resulting therefrom in the direction of the center of rotation. Because of the evacuation of gas over a certain area inside radius $r_1$ the otherwise necessary length of a centrifuge of $l_2$ is reduced to $l_1$. As no spout-like gas separation near the center of rotation has to be done, no elements for the stabilisation thereof are necessary either. Because of the efficient separating function, the sieves or the like used so far may be dispensed with as well.

FIGS. 13 to 15 show various arrangements of the device according to the invention in a housing 12 which is ordinarily disposed below a container to be evacuated. FIG. 13 differs from FIG. 14 in that in FIG. 13 the device is completely contained in the housing 12, while the device of FIG. 14 protrudes at least partly into the container arranged thereabove.

FIG. 15 shows the arrangement of the device in housing 12 with an oblique shaft 9.

In FIGS. 16 und 17 the device is directly connected with the shaft 9 of a pump arranged downstream thereof, the collecting channel 7 in FIG. 16 being provided centrally in the shaft 9 and sucked off via an annular chamber 17. By contrast, in FIG. 17 suction takes place via an annular gap 7'. In particular, the gap is defined by a collar or sleeve annularly disposed in spaced relation from the device drive shaft and the pump drive shaft, such that an annular gap extends from the gas discharge opening in the body, to a collection chamber surrounding the pump drive shaft. As shown in FIGS. 16 and 17, the collection chambers 17, are provided downstream of the pump rotors.

FIGS. 18 and 19 show arrangements of the device in a housing 12 to which pump 18 is directly connected.

Figure 20:
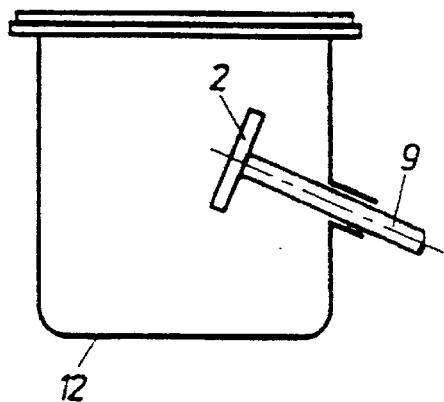
FIG. 20 shows a side view of a variant for discontinuous use of the device.

If a liquid-solids-gas-mixture is to be degassed discontinuously, an arrangement according to FIG. 20 is used.

Figure 21:
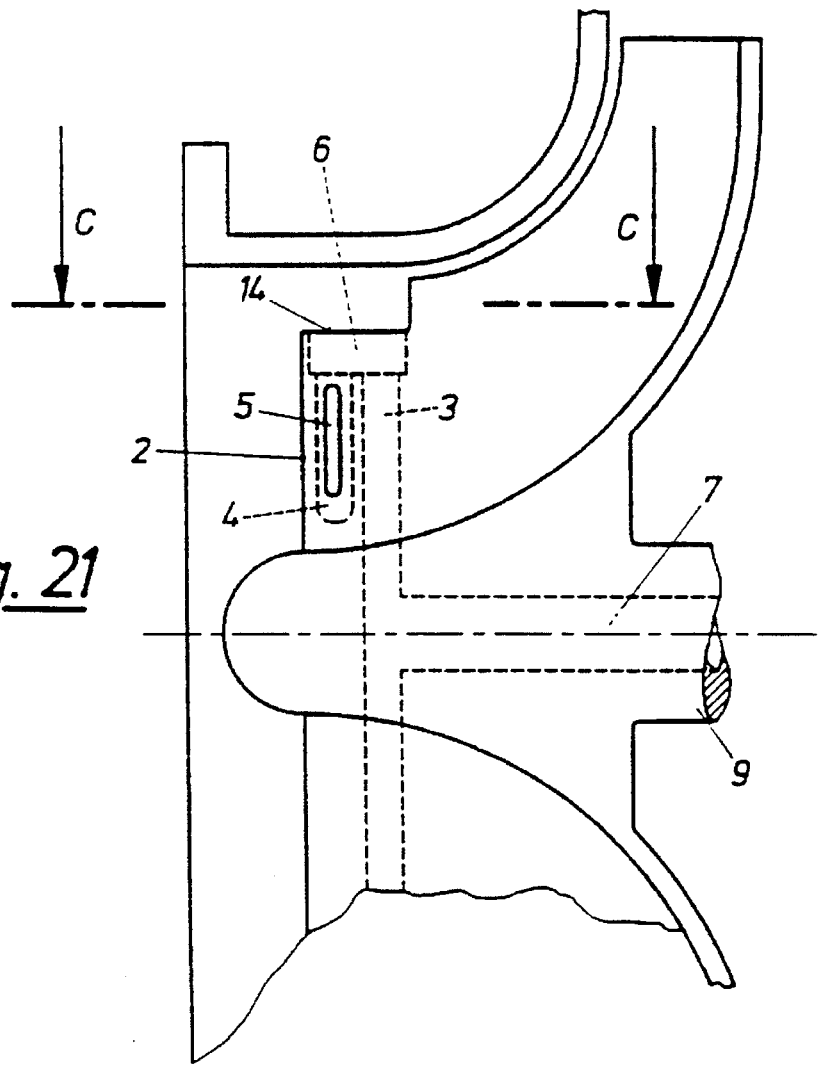
FIG. 21 shows a side view illustrating the incorporation of the device in a pump rotor vane.
Figure 22:
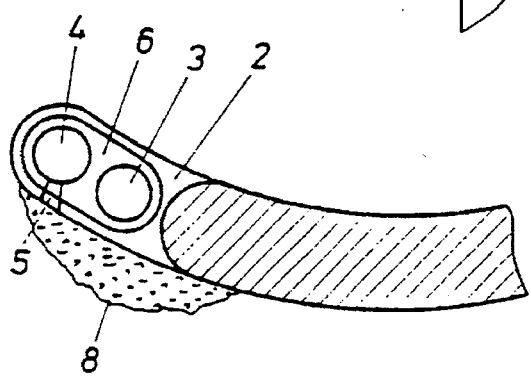
FIG. 22 shows section C—C according to FIG. 21.

FIG. 21 shows an embodiment wherein the device is directly integrated into the pump rotor vane. FIG. 22 shows a section C—C according to FIG. 21. Preferably, the body of the separating device, forms the upstream end of the rotor vane. The pump drive shaft 9 includes a gas collection channel which extends along the pump drive shaft to a gas collection chamber downstream of the rotor vane. The gas discharge opening from the discharge channel 3 in the body, is in fluid communication with the gas collection channel 7. The inlet 5 and inlet channel 4 are situated upstream relative to the discharge channel 3, when viewed along the direction of media flow through the pump.

Basically body 1 of the device may also take a form so as to achieve a conveying effect on the medium.

The illustrated embodiments of the invention only serve as examples and may be modified by one skilled in the art within the scope of the claims.

I claim:

1. In a process for separating gaseous components from a pourable feed media including a liquid component, by relative movement between the media and a body situated in the media, the improvement wherein the body includes a portion comprising a vane surrounded by said media which presents an external surface to the media;

the media first flows closely along said external surface;

the flow subsequently lifts off said external surface of the body, thus forming an underpressure zone, such that gas-enriched medium accumulates in the underpressure zone;

said accumulated medium is directed into the interior of the body through an inlet opening arranged on the body in the underpressure zone;

the gaseous component of the enriched medium is directed from the interior of the body out of the body for discharge away from the feed media; and the non-gaseous components of the enriched medium are directed from the interior of the body into the feed media surrounding the body at a location of the body remote from said inlet opening.

2. The process according to claim 1, wherein the medium enriched with gas, entering the interior of the body, is subjected to centrifugal force inside the body.

3. The process according to any of claims 1 or 2, wherein the relative movement is achieved by rotating the body.

4. The process according to any of claims 1 or 2, wherein the relative movement is achieved by rotation of the body in a stream of flowing feed medium.

5. The process according to claim 4, wherein the relative speed is adjusted by changing the speed of movement of at least one of the body and the feed medium.

6. The process according to claim 5, wherein the relative speed is adjusted in dependance on the state parameters of the feed medium.

7. The process according to any of claims 1 or 2, wherein the direction of flow of gas inside the body is changed by deviating it at least about 90°.

8. The process according to claim 7, wherein the gas separated from the medium is directed from the interior of the body by vacuum suction.

9. The process according to claim 8, wherein the suction is adjusted in dependance on the state parameters of the medium to be degassed.

10. In a device for separating gaseous components from pourable media, having means for generating relative movement between the media and a body surrounded by the media, the improvement wherein:
the body comprises a vane surrounding said media with an external surface which causes an under pressure zone to form on said external surface of the body in the course of said relative movement of the body and surrounding media, and
the body has at least one inlet at said external surface in the vicinity of the underpressure zone, said inlet fluidly communicates with a channel means in the body such that gaseous components with media are drawn into said channel means from the underpressure zone, and the gaseous components are separated from the media by centrifugal force in the channel means, said channel means including
a gas discharge channel inside the body for transporting off separated gas components, and
at least one media recycle channel through the body which is open to the outer radial periphery of the body, for delivering media separated from the gaseous components, to the surrounding media.

11. The device according to claim 10, wherein the body is mounted rotatably about a rotation axis.

12. The device according to claim 11, wherein the gas discharge channel transports separated gas components toward the rotation axis.

13. The device according to any of claims 11 or 12, wherein the media recycle channel fluidly communicates with an enlarged cavity which is open at the radially outer circumference of the rotation.

14. The device according to claim 13, wherein the media recycle channel fluidly communicates with the gas discharge channel, via the enlarged cavity.

15. The device according to claims 10 or 12, wherein the body has several arms.

16. The device according to claim 15, wherein several arms are arranged in one plane.

17. The device according to claim 15, wherein the arms are arranged in at least two planes with respect to the rotation axis.

18. The device according to claim 12, wherein the gas discharge channel opens into a collecting channel through which the separated gas component is transported off.

19. The device according to claims 10 or 12, wherein the gas discharge channel communicates with a suction device.

20. The device according to claim 18, wherein the body is connected to a rotational drive shaft and the collecting channel is arranged in the drive shaft.

21. The device according to claim 13, wherein several inlet openings are arranged adjacent to each other on the body.

22. The device according to claim 13 wherein at least one inlet takes the form of a slot oriented in the radial direction.

23. The device according to claim 13, wherein at least one inlet has a cross section widening in the direction toward the interior of the body.

24. The device according to claim 11, wherein at least one additional vane oriented substantially in parallel to the rotation axis is provided at the outer radial periphery of said body.

25. The device according to claim 15, wherein at least one inlet takes the form of a slot oriented in the radial direction.

26. The device according to claim 10 wherein,
said body has a radially inner portion mounted for rotation about a central axis, a radially outer portion defining a radial periphery, whereby said underpressure zone forms on said external surface at a radial distance from the central axis,
said channel means in said body defines a continuous internal space extending from the inner portion to the outer portion of the body,
means are provided for rotating the body through the pourable media,
said gas discharge channel includes a gas discharge opening at the radially inner portion of the body,
said media recycle channel includes a media discharge opening at the radial periphery of the body,
whereby when media containing gaseous components enters said internal space from said inlet, centrifugal force from rotation of the body, separates the gaseous and media components in said space, with the gaseous components withdrawn from the body through the gas discharge opening, and the separated media recycled into the pourable media through the media discharge opening.

27. The device according to claim 15, wherein several inlet openings are arranged adjacent to each other on the body.

28. The device according to claim 15, wherein at least one inlet has a cross section widening in the direction toward the interior of the body.

29. The device of claim 26, wherein the internal space is defined by,
a cavity at the outer portion of the body, in fluid communication with said media discharge opening,
an inlet channel extending in fluid communication between the inlet and said cavity parallel to the central axis, and
a discharge channel extending in fluid communication between the cavity and the gas discharge opening.

30. The device of claim 29, wherein the discharge channel extends radially.

31. The device of claim 26, wherein the body has a radial length from the inner portion to the outer portion, and the inlet comprises a plurality of distinct bores oriented transversely to a radius from the central axis and spaced along the radial length of the body.

32. The device of claim 26, wherein the external surface is formed as upper and lower air foil surfaces on the body, and the inlet comprises a plurality of openings on at least one of the upper and lower air foil surfaces.

33. The device of claim 26, wherein said body has,
an arm which defines said inner portion and extends radially to define said outer portion, and
at least one wing portion which extends from said arm in a direction substantially parallel to said central axis, and defines said external surface.

34. The device of claim 33, wherein said inlet is oriented to draw gaseous components with media, in a direction which is substantially mutually perpendicular to the central axis and a radius passing from said axis through said arm.

35. The device of claim 34, wherein said internal space is defined by,
a cavity at the outer portion of the arm, in fluid communication with said media discharge opening,
an inlet channel extending in fluid communication between the inlet and said cavity, and a discharge channel extending in fluid communication between the cavity and the gas discharge opening.

36. The device of claim 35, wherein the discharge channel extends radially and the inlet channel enters said cavity along a path which is substantially parallel to said central axis.

37. The device of claim 26, wherein the body projects radially from a device drive shaft extending along the central axis, and said device drive shaft coaxially projects from, for co-rotation with, a drive shaft of a media pump situated downstream of the device.

38. The device of claim 37, wherein the gas discharge opening fluidly communicates with a gas collecting channel which extends along the central axis, through the device drive shaft and the pump drive shaft, into an annular gas collection chamber surrounding the pump drive shaft.

39. The device of claim 37, wherein gap means are provided for defining an axially extending, annular gap around the device drive shaft and the pump drive shaft, said annular gap extending from the gas discharge opening to a collection chamber surrounding the pump drive shaft.

40. The device of claim 26, wherein said body is integrated with a pump rotor vane rotatable by a pump drive shaft centered on the central axis, for pumping said media.

41. The device of claim 40, wherein the pump drive shaft includes a gas collection channel which extends along the pump drive shaft to a gas collection chamber downstream of the rotor vane, and the gas discharge opening is in fluid communication with said gas collection channel.

42. The device of claim 41, wherein the internal space is defined by, a cavity at the outer portion of the body, in fluid communication with said media discharge opening, an inlet channel extending in fluid communication between the inlet and said cavity, and a discharge channel extending in fluid communication between the cavity and the gas discharge opening.

43. The device of claim 42, wherein the inlet channel is situated at a different elevation from the discharge channel, when the body is viewed in cross-section.

44. The device of claim 43, wherein the inlet and the inlet channel are situated upstream relative to the discharge channel, when viewed along the direction of media flow through the pump.

45. The device of claim 40, wherein said rotor vane has an upstream end and said body forms said upstream end.

46. A device for separating gaseous components from a pourable media surrounding the device, comprising:

a body having a radially inner portion mounted for rotation about a central axis, a radially outer portion defining a radial periphery, and a vane-shaped external surface surrounded by said pourable media which causes an underpressure zone to form on said external surface at a radial distance from the central axis, when the body and surrounding media are in relative movement, said body further having a continuous internal space extending from the inner portion to the outer portion of the body;

means for rotating the body through pourable media containing gaseous components;

an inlet leading from the external surface at said underpressure zone into said internal space, for drawing gaseous components with media into said internal space from said underpressure zone;

a gas discharge opening at the radially inner portion of the body, in fluid communication with said internal space;

a media discharge opening at the radial periphery of the body, in fluid communication with said internal space;

whereby when media containing gaseous components enters said internal space from said inlet, centrifugal force from rotation of the body, separates the gaseous and media components in said space, with the gaseous components withdrawn from the body through the gas discharge opening, and the separated media recycled into the pourable media through the media discharge opening.

47. The device of claim 46, wherein the interior space consists of a cavity extending radially along a straight path between the gas discharge opening and the media discharge opening.

48. The device of claim 46, wherein the internal space is defined by, a cavity at the outer portion of the body, in fluid communication with said media discharge opening, an inlet channel extending in fluid communication between the inlet and said cavity, and a discharge channel extending in fluid communication between the cavity and the gas discharge opening.

49. The device of claim 48, wherein the discharge channel extends radially and the inlet channel extends in parallel to the discharge channel.

50. The device of claim 49, wherein the inlet channel is situated at a different elevation from the discharge channel, when the body is viewed in cross-section.

51. The device of claim 46, wherein the body has a radial length from the inner portion to the outer portion and the inlet is a slot extending along substantially the full radial length of the body.

52. The device of claim 46, wherein the inlet is situated at a radial distance from the central axis, between the radial distance of the discharge opening for the gaseous components, and the radial distance of the discharge opening for the media.

* * * * *